Figure 1:
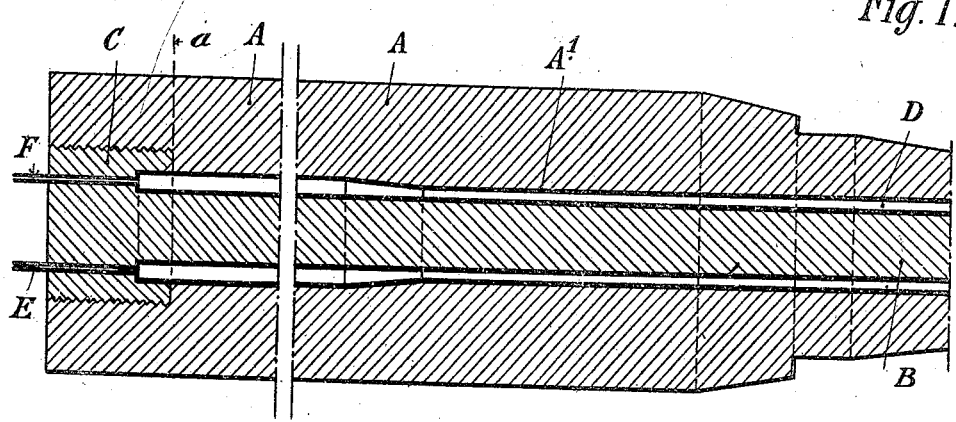

Mar. 6, 1923.

E. SCHNEIDER.

METHOD AND APPARATUS FOR THE MANUFACTURE OF METAL TUBES.

FILED JULY 26, 1921.

1,447,821.

3 SHEETS—SHEET 1.

Inventor,
Eugene Schneider
By Mauro, Cameron, Lewis & Kerkam
attorneys

Mar. 6, 1923. 1,447,821.
E. SCHNEIDER.
METHOD AND APPARATUS FOR THE MANUFACTURE OF METAL TUBES.
FILED JULY 26, 1921. 3 SHEETS—SHEET 2.
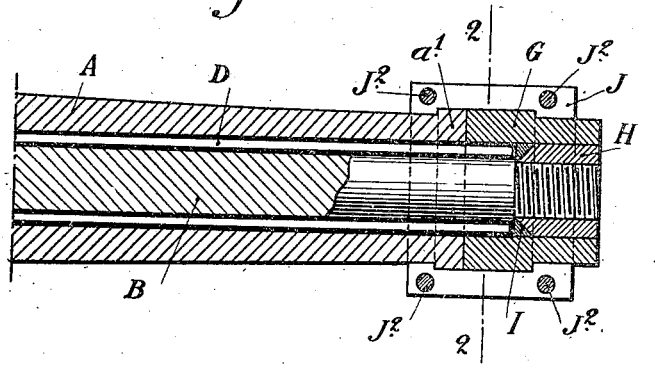
Fig. 1.ᵃ
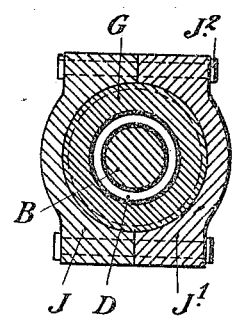
Fig. 2.
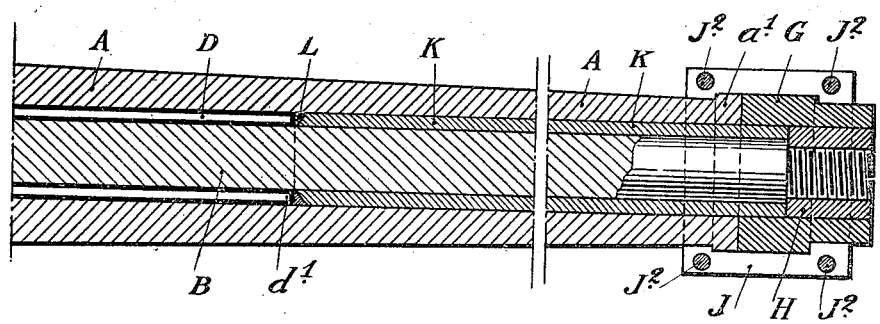
Fig. 3.ᵃ
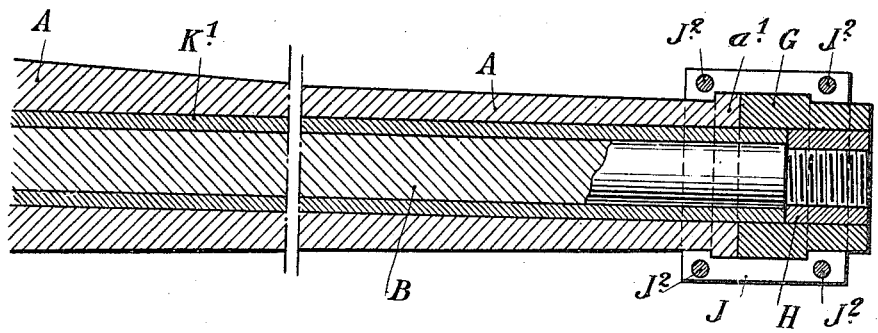
Fig. 4.ᵃ
Inventor
Eugene Schneider,
By Mauro, Cameron, Lewis & Kerkam
attorneys

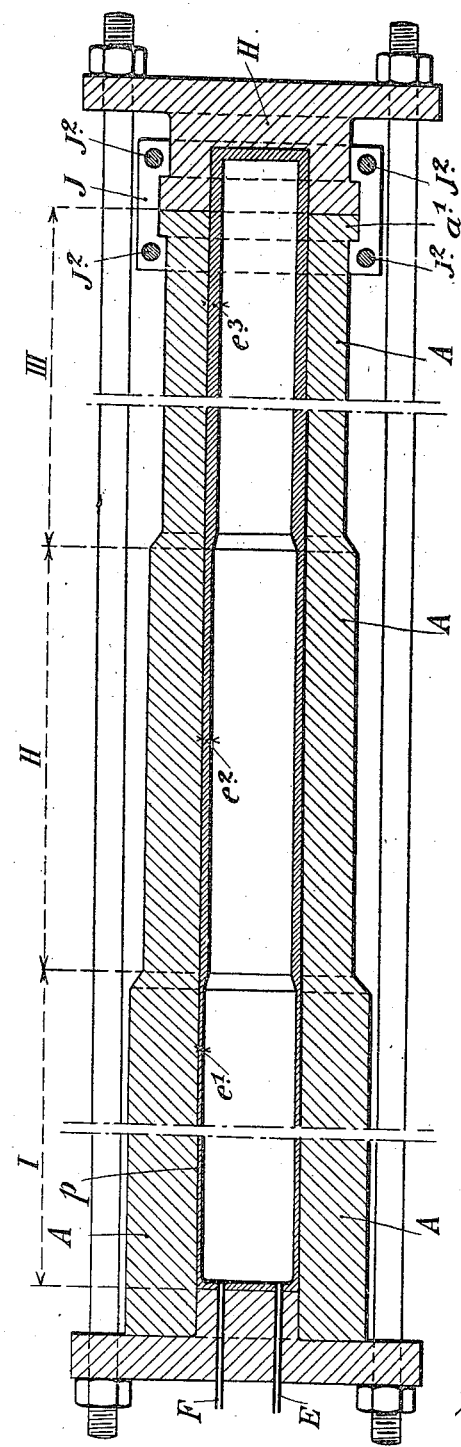

Patented Mar. 6, 1923.

1,447,821

UNITED STATES PATENT OFFICE.

EUGENE SCHNEIDER, OF PARIS, FRANCE, ASSIGNOR TO SCHNEIDER & CIE., OF PARIS, FRANCE, A LIMITED JOINT-STOCK COMPANY OF FRANCE.

METHOD AND APPARATUS FOR THE MANUFACTURE OF METAL TUBES.

Application filed July 26, 1921. Serial No. 487,682.

*To all whom it may concern:*

Be it known that I, EUGENE SCHNEIDER, a citizen of the Republic of France, residing at 42 Rue d'Anjou, Paris, France, have invented new and useful Improvements in Method and Apparatus for the Manufacture of Metal Tubes, which is fully set forth in the following specification.

This invention has for its object to provide an improved apparatus for the manufacture of very strong metal tubes by the compressive action of a liquid under pressure.

The usual process of manufacturing metal tubes by the compressive action of a liquid under pressure consists in causing a metal tube previously made with an internal diameter smaller than the desired internal diameter of the finished tube, to assume the said desired internal diameter by compression of the inner layers of the metal which are thus gripped tightly by the outer layers that are under tensile strain.

That known process is generally performed by forcing the liquid under pressure into the annular space comprised between the inner surface of the tube to be manufactured and the outer surface of a very strong bar or mandrel.

That process has the drawback that it is necessary to provide perfectly tight joints at the ends of the mandrel. More especially in manufacturing tubes of great thickness and very great length, such as tubes for the manufacture of long-range guns, it is necessary to subject the tube to different pressures gradually diminishing from the breech to the muzzle of the gun, and for this purpose it is necessary to produce the compression effect in successive zones by correspondingly shifting one of the joints. Moreover in order to allow of compressing the tube throughout its entire length, it is necessary to provide a tube of greater length than the length which it is desired to obtain, so as to be able to accommodate the end joints within the said greater length. The compressed tube must then be cut to the said desired length.

The improved apparatus of this invention not only obviates the last mentioned drawbacks, but it also allows of effecting the compression of the tube without the use of any tight joint.

According to this invention the liquid under pressure is admitted into a pocket made of sheet metal, brass, rubber or other deformable material; the external longitudinal surface of the pocket being in contact with the internal surface of the tube to be compressed, at the commencement of the operation. This closed pocket is provided at one end only with a duct for the admission of the liquid, and with a duct for the escape of air or the liquid. The pocket is deformed together with the tube to be compressed and thus transmits the pressure to the latter.

Some examples of the application of this invention to the compression of a gun barrel tube are illustrated in the accompanying drawings in which:—

Figs. 1 and 1ª comprise an axial sectional elevation of the tube to be compressed.

Fig. 2 is a section on the line 2—2 of Fig. 1.

Figure 3:
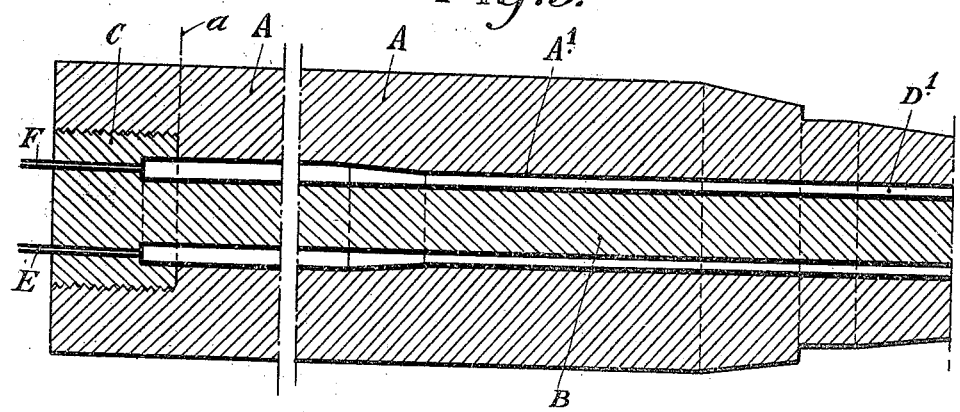
Figure 4:
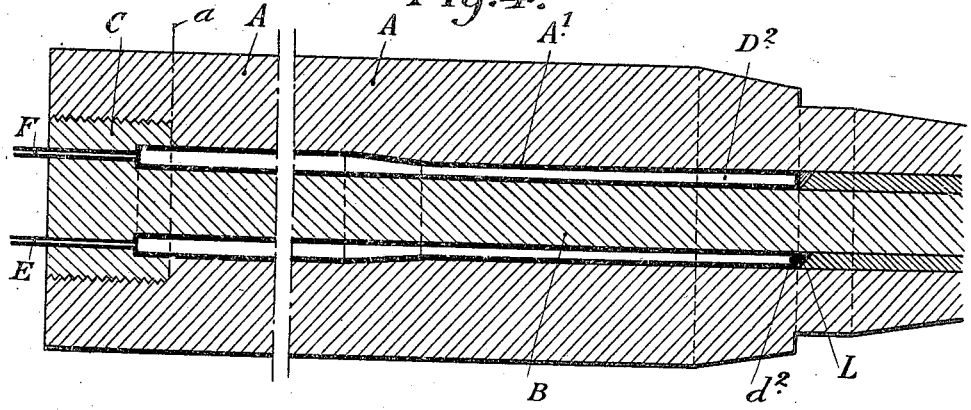

Figs. 3, 3ª and 4, 4ª are longitudinal sectional elevations similar to Fig. 1, showing the successive applications of hollow sleeves of gradually decreased lengths for use in the compression by means of increasing pressures acting upon successive zones of the length of the tube to be manufactured.

Fig. 5 is a sectional elevation of a modification.

In Figs. 1 to 4, A is the tube to be compressed between the transverse vertical plane $a$ near the breech and the muzzle $a^1$. A very strong compression mandrel B is held at one end in an annular plug C screwed into the end of the tube that is intended to form the breech of the gun. This mandrel projects at its other end beyond the muzzle $a^1$ of the gun tube.

A pocket D having the form of a hollow sleeve, made of thin sheet metal, brass, rubber or other suitable material, is placed between the mandrel B and the inner surface $A^1$ of the tube to be manufactured.

The pocket-sleeve D is entirely closed at its forward end. To its rearward end there are suitably connected by welding or otherwise two pipes E, F serving respectively for the admission of the liquid under pressure, and for the escape of air or excess liquid, or for the exit of the liquid for emptying the pocket-sleeve. The front end portion of the pocket sleeve D projects beyond the muzzle end $a^1$ of the tube, and bears with its outer surface against a strong sleeve G, whereas its end face bears through the medium of a split ring I against a nut H.

The sleeve G is held up against the muzzle $a^1$ of the tube by a divided collar J—$J^1$ whose sections are fastened together by bolts $J^2$.

The thin deformable pocket-sleeve D has no joints whatever; by reason of its extension beyond the muzzle $a^1$, it allows of applying the pressure over the entire length $a$—$a^1$.

Since it (the pocket-sleeve D) is perfectly tight, there is no risk of any leakage occurring during the compressing operation.

When it is desired to apply increased pressures to different zones of the tube, use is made of a pocket-sleeve D extending the whole length of the tube as shown in Fig. 1, and the tube is subjected to a uniform pressure through its whole length. Then the mandrel B and the pocket-sleeve D are withdrawn, and the latter is replaced by a pocket-sleeve $D^1$ of reduced length (Fig. 3), the space thus left between the front end $d^1$ of this shorter pocket-sleeve and the nut H being filled up by a distance piece K. Liquid under a pressure higher than that which was employed in the pocket-sleeve D, is now admitted into the pocket sleeve $D^1$. The mandrel B and the pocket-sleeve $D^1$ are withdrawn afresh, and the latter is replaced by a still shorter pocket-sleeve $D^2$ (Fig. 4); likewise the distance piece K is replaced at the same time by a longer distance piece $K^1$ which fills up the entire annular space left between the front end $d^2$ of the pocket-sleeve $D^2$ and the nut H. A split ring L may be interposed between the front ends of the pocket-sleeve $D^1$, $D^2$ and the distance pieces K, $K^1$. The split ring I may be employed for this purpose.

With the apparatus shown in Fig. 5, it is possible by means of a single continuous pocket-sleeve to effect the compression of a gun tube by applying different deforming pressures to different zones of the length of the said tube.

In this example the mandrel is entirely dispensed with, and a uniform internal pressure is exerted within a deformable tubular pocket-sleeve having walls of different thicknesses.

In the illustrated example it is assumed that the tube to be treated comprises three zones I, II, III diminishing in thickness from the breech to the muzzle.

The deformable pocket-sleeve whose external surface $p$ bears against the internal surface of the tube to be treated has walls $e^1$, $e^2$, $e^3$ of increasing thicknesses for lengths corresponding to the zones I, II and III.

If a suitable pressure is applied to the inside of the pocket-sleeve, after having suitably chosen the thicknesses $e^1$, $e^2$, $e^3$, it will be perceived that by means of this pressure (which is uniform throughout the entire length of the pocket-sleeve) suitably diminishing pressures may be exterted upon the zones I, II, III of the tube.

Having now particularly described and ascertained the nature of my said invention and in what manner the same is to be performed, I declare that what I claim is:—

1. An apparatus for the manufacture of metal tubes by the compressive action of a liquid under pressure comprising, in combination, an elastic pocket having a plurality of openings in one end thereof, means positioned at the opposite end of said pocket, and means engaging the tube to be manufactured for rigidly holding said first named means in contact with said pocket.

2. An apparatus for the manufacture of metal tubes by the compressive action of a liquid under pressure comprising in combination, an elastic pocket, a pipe at one end of said tube for the admission of liquid under pressure, a discharge pipe having communication with said pocket through said end, said pocket being of such length that the opposite end thereof projects beyond the forward end of the tube to be manufactured, and means rigidly supporting said projecting pocket end.

3. An apparatus for the manufacture of metal tubes by the compressive action of a liquid under pressure comprising in combination, a cylindrical pocket, a pipe at one end of said tube for the admission of liquid under pressure, a discharge pipe having communication with said pocket through said end, said pocket being of such length that the opposite end thereof projects beyond the forward end of the tube to be manufactured, and means rigidly supporting said projecting pocket end.

4. The method of manufacturing a metal tube of great strength which comprises inserting and rigidly supporting a mandrel in said tube, said mandrel being of greater length than the tube and projecting from the forward end thereof, inserting an elastic pocket between said mandrel and the inner surface of said tube, rigidly supporting the forward ends of said mandrel and pocket, and introducing a liquid under pressure into said pocket through the opposite end thereof.

5. Means for manufacturing metal tubes by the compressive action of a liquid pressure comprising in combination, a mandrel rigidly supported in said tube, an elastic pocket having a plurality of openings in one end thereof adapted to be positioned between said mandrel and said tube, and means rigidly supporting the forward end of said pocket, said last named means comprising a split ring, a member abutting said ring, and a sleeve surrounding said member.

6. The method of manufacturing a metal tube by the compressive action of a fluid applied at increased pressures to different zones of the tube which comprises inserting and rigidly supporting in said tube an elastic pocket, introducing a liquid under pressure into said pocket, removing said pressure and withdrawing said pocket, and successively inserting and rigidly supporting in the tube elastic pockets of different reduced lengths, and introducing a liquid under different pressures into said pockets.

In testimony whereof I have signed this specification.

EUGENE SCHNEIDER.

Witnesses:
 ANDRÉ MOSTICKER,
 LOUIS GARDET.